Patented Sept. 15, 1953

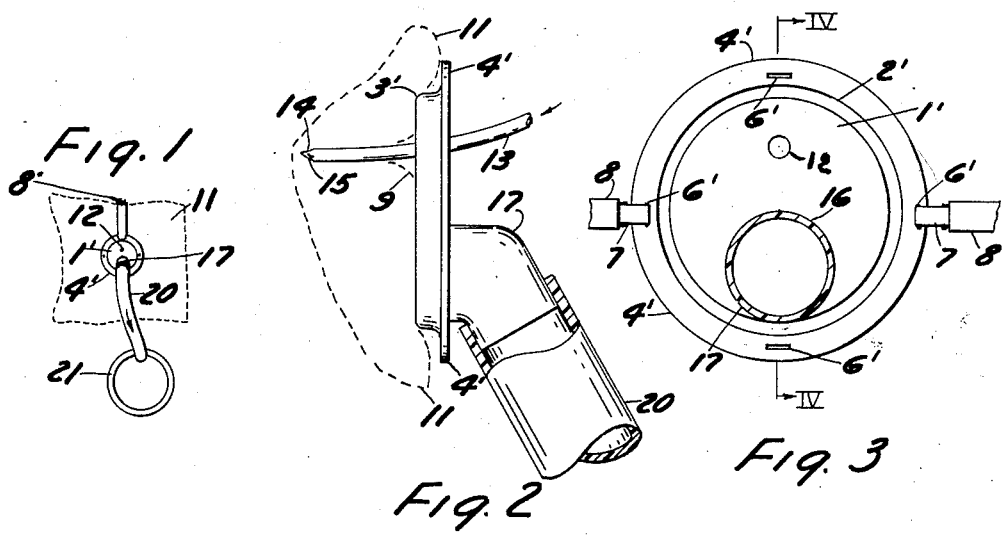
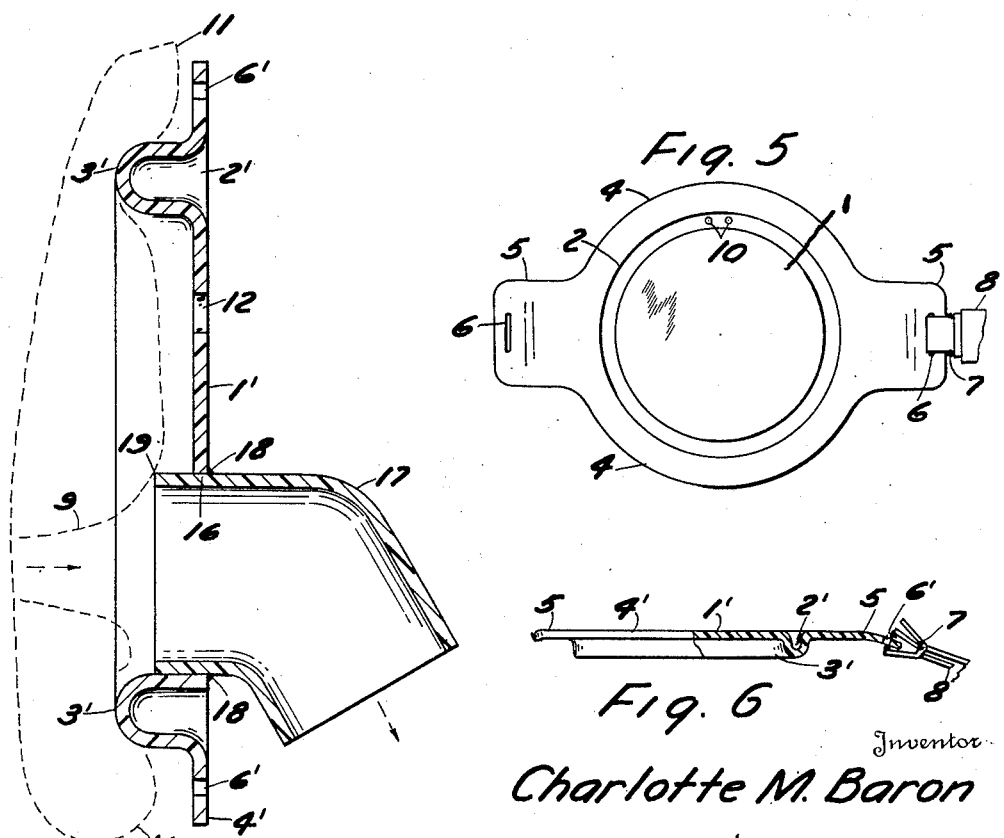

2,652,055

UNITED STATES PATENT OFFICE 2,652,055

COLOSTOMY DEVICE

Charlotte M. Baron, Toledo, Ohio

Application May 1, 1950, Serial No. 159,343

4 Claims. (Cl. 128—283)

This invention relates to a colostomy device. More particularly it deals with a device for covering a colostomy type of body opening or orifice, which device may be provided either with or without separate ports through which the colostomy or body opening may be flushed or irrigated and/or drained or discharged. The colostomy device without such ports is for ambulatory patients to protect and cover the body opening during normal movements.

It is an object of this invention to produce a simple, efficient, effective and economic colostomy device, which is light weight, transparent, warm to the touch (that is made of plastic material), produces a fluid-tight junction with the skin of the patient surrounding the colostomy or body opening, and is easy to install, wear, and shift its position on the body.

Generally speaking, the colostomy device of this invention comprises a flat continuous disk or plate member, which preferably is circular in shape. Near the periphery of said plate is provided a circular ridge or rib which projects above one and the inner surface of the plate for contact with the skin of the wearer around a colostomy or body opening, and produces a relatively fluid-tight seal with the skin. For ambulatory patients this rib may be provided with one or more small holes to permit breathing and prevent perspiration under said plate. The irrigating and discharging form of this colostomy device includes instead of the breathing holes in the rib, a pair of diametrically spaced apertures or ports in the plate inside the rim, one of which ports is preferably smaller than the other and which is adapted for a syringe or enema tube for flushing or irrigating the colostomy when the plate is placed so that this smaller hole is in line with the body opening. The larger port may have outwardly sealed therein an elbow duct the inner end edge of which may extend beyond the inner face of the plate, so that it may fit closely against or around the lips of the body opening to prevent communication from the body opening under the plate with the smaller port. The outer end of the elbow duct may be connected to a flexible hose for directing any offal or other material exuded from the colostomy or body opening into a receptacle. The plate also may be provided with an outwardly extending flange outside its rib to which a belt or strap may be attached to hold the colostomy device in proper place on the body.

The above mentioned and other objects of this invention and the manner of attaining them are given more specific disclosure in the following description of an embodiment of the invention taken in conjunction with the accompanying drawing, wherein:

Fig. 1 is a plan view of the embodiment of the colostomy device adapted for irrigating and draining a colostomy opening shown in place on a supine patient (partly shown in dotted lines) and connected with a flexible hose discharge duct to a bedside receiver;

Fig. 2 is a side elevation of the device shown in Fig. 1 on a larger scale, shown in its colostomy irrigating position over a colostomy opening;

Fig. 3 is a plan or front view of the colostomy device shown in Fig. 2 with part of the elbow broken away;

Fig. 4 is an enlarged sectional view taken along line IV—IV of the device shown in Fig. 3, shown in its colostomy draining position over a colostomy opening;

Fig. 5 is a plan view of the modified form of a colostomy closure device adapted for ambulatory patients; and Fig. 6 is a side elevation partially in section of the embodiment shown in Fig. 5.

Referring first to Figs. 5 and 6 of the simplified form of the colostomy device of this invention as adapted for ambulatory patients, there is shown a central flat circular disk or plate 1 near the periphery of which is impressed a circular groove 2 forming a continuous ridge or rib 3 projecting from one or the inner side of the plate 1. The outer or peripheral edge of the plate 1 beyond the groove 2 may have a flange 4 in the same plane as the plate 1, and may also include diametrically projecting ears or lobes 5 which may be provided with slots 6 into which a snap catch 7 at the end of an adjustable elastic band 8 may be connected for surrounding the abdominal portion of the body of the patient to maintain the colostomy device in its proper position over the colostomy or body opening 9. The length of the band, however, may be adjusted at will to fit the patient. In order to permit breathing of the colostomy opening, small vent openings 10 may be provided through the rib portion 3, preferably at the top of the device so as to relieve gas pressure and prevent perspiring under the plate 1 without permitting liquid leakage. If desired, instead of the strap 8 and hooks 7, the colostomy device may be anchored in place by means of adhesive tape 8', as shown in Fig. 1.

The rib 3 being pressed against the skin of the patient surrounding his body opening, forms a fluid tight seal between the colostomy device and the body opening 9 (see Figs. 2 and 4). The unit piece or member comprising plate 1, rib 3 and flange 4 of Figs. 5 and 6, may be molded from a light weight transparent plastic material and is sufficiently thin or flat to permit a patient to dress with normal apparel over it and move about without any concern either about the colostomy device or his colostomy.

Referring to Figs. 1, 2, 3 and 4 there is shown another embodiment of a colostomy device, which may be made from and is similar to the basic structure of the device shown in Figs. 5 and 6. In this embodiment, the central circular plate 1' is also provided with a circular groove 2' forming an annular rib 3' projecting from one side of the plate 1', and beyond the surrounding rib 3' may be provided a circular flange 4', in which there may be provided four 90° spaced slots 6', into which clips 7 on a belt 8 may be connected. In addition to these features the plate 1' is provided diametrically in line with one pair of slots 6', a smaller port 12 and a larger port 16, the latter having its edge substantially adjacent the inside of the rib 3' as shown in Fig. 4. The smaller opening 12 is preferably of such a diameter that a normal syringe or enema tube 13 may be snugly slipped therethrough when the colostomy is in the position shown in Fig. 2, so that the tip 14 of the syringe having orifice 15 may be inserted into the colostomy opening 9 and a rinsing liquid may be injected into the opening or colostomy for irrigating or flushing. After the colostomy has been irrigated in this manner the colostomy device may then be moved into the position shown in Fig. 4 where the larger opening 16 is aligned with the orifice 9, for discharge of the matter from the colostomy. Within the larger opening 16, there may be provided a plastic elbow duct 17, which may be plastically welded at 18 to form a fluid-tight seal in the port 16. This elbow preferably extends slightly inside the inner face 1' in the direction of the rib 3', so that its inner edge may contact the lips 19 of the colostomy opening, so that the discharge of material will not also pass through the smaller port 12. Furthermore, connected to the other end of the elbow 17 may be a large flexible rubber hose or discharge duct extension 20 which may extend into a suitable receiver, such as a slop jar 21 shown in Fig. 1, or into a stool, if the patient is in a seated position.

While there is described above the principles of this invention in connection with specific apparatus, it is to be clearly understood that this description is made only by way of example and not as a limitation to the scope of this invention.

What is claimed is:

1. A colostomy device for a body opening comprising: a substantially flat plate for covering said opening, a rib around said plate for sealing engagement with the skin surrounding said opening, a flushing opening into said plate, and a discharge opening in said plate.

2. A device according to claim 1 including a flange on said plate outside said rib, and means connected to said flange for attaching said device to the body.

3. A device according to claim 1 including an elbow duct member fitted through said discharge opening.

4. A device according to claim 1 composed of a transparent plastic material.

CHARLOTTE M. BARON.

References Cited in the file of this patent

UNITED STATES PATENTS

| Number | Name | Date |
|---|---|---|
| 2,331,226 | Pritchard | Oct. 5, 1943 |
| 2,438,769 | Thomas | Mar. 30, 1948 |
| 2,504,872 | Perry | Apr. 18, 1950 |
| 2,604,096 | Smith | July 22, 1952 |

FOREIGN PATENTS

| Number | Country | Date |
|---|---|---|
| 217,480 | Great Britain | June 19, 1924 |
| 469,975 | Great Britain | Aug. 6, 1937 |